Figure 1:
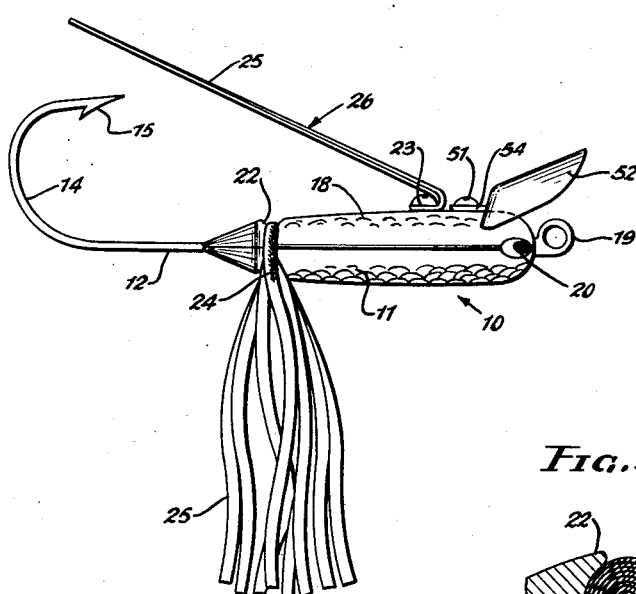

Sept. 26, 1950     W. M. GAMBILL     2,523,949

FISH LURE

Filed Sept. 23, 1947

INVENTOR

W. M. GAMBILL.

BY Kimmel & Crowell

ATTORNEYS

Patented Sept. 26, 1950

2,523,949

UNITED STATES PATENT OFFICE 2,523,949

FISH LURE

William Milton Gambill, Abilene, Tex.

Application September 23, 1947, Serial No. 775,647

2 Claims. (Cl. 43—42.28)

This invention relates to an improved fishing lure.

It is an object of this invention to provide an improved fish lure of the kind to be more particularly described hereinafter which is formed of a hook having a fish shaped body carried by the shank and streamers depending from the body near the rear end in such a manner to resemble the appendages of live bait.

Another object of this invention is to provide an improved lure of this kind formed with protuberances at the forward end which extend from the body proper so that they resemble the eyes of many types of fish which may be viewed readily from above or below the lure.

Still another object of this invention is to provide a fish lure or artificial bait of this kind which is formed with a metal body carried by the shank of a hook and coated with a plastic covering. The plastic covering is formed in such a manner that the streamers, which depend from the lure, may be readily attached to or removed from the body.

A further object of this invention is to provide an improved fish lure having a resilient wire guard for the hook to prevent the hook from becoming entangled in weeds at the bottom of the body of water, the hook guard being so constructed and arranged to resemble the antennae of certain types of fish.

With the above and other objects in view, my invention consists in the arrangement, combination and details of construction disclosed in the drawings and specification, and then more readily pointed out in the appended claims.

Figure 5:
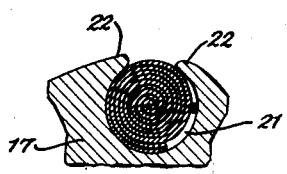
Figure 2:
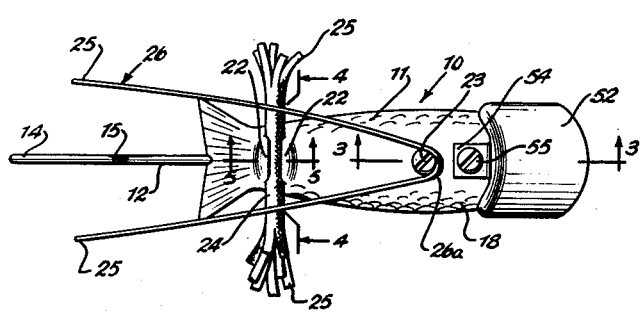
Figure 4:
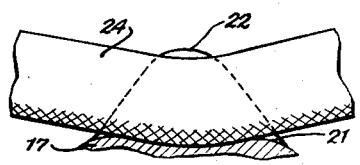
Figure 3:
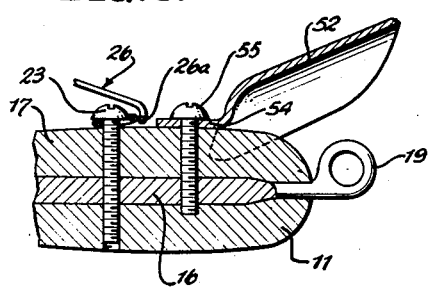

In the drawings,

Figure 1 is a side elevation of a fishing lure constructed according to an embodiment of this invention, Figure 2 is a top plan view of the device of Figure 1, Figure 3 is a fragmentary longitudinal section taken on the line 3—3 of Figure 2, Figure 4 is a transverse section, partly broken away, taken on the line 4—4 of Figure 2, Figure 5 is a transverse section taken on the line 5—5 of Figure 2.

Referring to the drawings, the numeral 10 designates generally an improved fishing lure formed on a hook and having streamers for concealing the hook, and a resilient guard for preventing the hook from becoming engaged with objects on the bottom of the body of water.

The fishing lure 10 is formed of an elongated body 11 fixed to or formed on the shank 12 of a fish hook having the bill 14 at the rear end thereof and a barb 15 normally disposed above the body 11. The body 11 is formed of a metal core 16 which is preferably made of lead or brass or other suitable non-corrosive metal. The core 16 is then covered throughout its length with a plastic material 17. The lure may also be made from solid or hollow plastic to form a surface bait, or floater, in various forms, such as a mouse, grasshopper, etc.

The plastic material may be of any suitable color and is preferably formed with painted scales as 18, or other markings so that the lure 10 will resemble a minnow or other live bait. The attaching eye 19, which may comprise an extension of the shank 12 on the front end of the hook extends forwardly from the front end of the body 11. The plastic covering 17 is formed at its forward end with protuberances 20 which extend forwardly and to the sides of the body 11 to resemble the eyes of the bait.

A groove 21 is formed at the rear end of the body 11. The groove 21 extends transversely of the body 11 and is formed wholly within the plastic covering 17. Retaining horns 22 are formed in the plastic covering 17 along the opposite edges of the groove 21 and are spaced apart at their free ends. The facing horns 22 partially overlie the bottom of the groove 21 for retaining the streamer 24 therein.

The streamers 24 are formed of a blank flat strip of rubber or other resilient material slit towards the center thereof from each end to provide a plurality of strings 25 at each end. The streamers 24 are then rolled, as indicated in Figure 5, to provide a substantial center body therein for engagement in the groove 21 beneath the horns 22.

The streamers 24 are disposed transversely of the body 11 with the strings 25 thereof depending loosely from the upper sides of the body 11. The rear streamers 24 further are provided to resemble the tentacles of a crayfish.

For inserting the streamers 24 into the groove 21 the body or central portion of the streamers may be stretched to reduce the diameter and the reduced center portion is then pressed between the horns 22 into the bottom of the groove 21. When the streamer is then in position the tension may be released so that the center of the streamers will expand to its normal position, completely filling up the groove 21 so that the horns 22 will retain the streamer therein.

A weed guard 26 is mounted on the front end of the body 11. The guard 26 is formed of an elongated strip of wire bent into a U-shape, as indicated in Figure 2. The bight 26a is adapted to be engaged by a bolt 23 at the forward end of the body 11.

The rearwardly extending arms 25 of the guard 26 will normally be slightly bowed and extend upwardly at an angle from the front end of the body, as indicated in Figure 1. As the lure 10 is drawn into contact with weeds or other objects with which the barb 15 could become entangled, the guard 26 will be pivoted rearwardly so that the arms 25 will be disposed adjacent the bill 14 and barb 15, being biased upwardly therefrom and will urge the barb 15 downwardly away from the object with which it might become entangled.

At the forward end of the body 10 there is supported an upwardly extending lip or member 52 which is formed of a flat length of metal or other suitable material into a concavo-convex configuration.

The lip 52 is provided with a rearwardly extending ear 54 at the rear edge thereof through which a screw 55 engages for attaching the member 52 to the body 10 forwardly of the weed guard 26. The lip 52 is disposed with the concave side downward, partially overlying the attaching eye 19 and extending substantially forwardly of the front end of the body 10. The lip 52 provides for holding the lure 10 close to the bottom of the body of water with which it is used and upon rapid movement of the body 10 will tend to make the body weave or rise and fall as it moves through the water.

I do not mean to confine myself to the exact details of construction herein disclosed, but claim all variations falling within the purview of the appended claims.

What I claim is:

1. An improved fish lure comprising an elongated body, streamers carried by said body, said body formed with a transverse groove on one side thereof, oppositely disposed horns along the opposite edges of said groove and overlying the bottom of said groove, said streamers including a compressed resilient central body portion engageable in said groove and restrained therein by said horns.

2. An improved fishing lure comprising an elongated body, said body formed with a transverse groove therein, a pair of oppositely disposed spaced longitudinally apart horns along the edges of said groove partially overlying the bottom of the groove, streamers depending from said body on the opposite sides thereof and connected together by a compressed resilient connecting member, said connecting member engaging in said groove and being restrained against expansion therein by said horns, and a hook carried by said body.

WILLIAM MILTON GAMBILL.

REFERENCES CITED

The following references are of record in the file of this patent:

UNITED STATES PATENTS

| Number | Name | Date |
| --- | --- | --- |
| 1,334,249 | Lane | Mar. 16, 1920 |
| 1,611,635 | Dills | Dec. 21, 1926 |
| 1,769,747 | Major | July 1, 1930 |
| 1,884,053 | McGarraugh | Oct. 25, 1932 |
| 1,992,766 | Pflueger | Feb. 26, 1935 |
| 2,025,270 | Chaney | Dec. 24, 1935 |
| 2,165,734 | Stracener | July 11, 1939 |
| 2,290,512 | Weesner | July 21, 1942 |
| 2,328,295 | Provost | Aug. 31, 1943 |